United States Patent [19]
Collin

[11] Patent Number: 6,148,080
[45] Date of Patent: Nov. 14, 2000

[54] MOBILE TELEPHONE WITH AMPLIFIED LISTENING

[75] Inventor: Pascal Collin, Le Mans, France

[73] Assignee: U.S. Philips Corporation, New York, N.Y.

[21] Appl. No.: 09/123,445

[22] Filed: Jul. 28, 1998

[30] Foreign Application Priority Data

Sep. 17, 1997 [FR] France .................................. 97 11582

[51] Int. Cl.⁷ .................................................. H04M 1/00
[52] U.S. Cl. ............................................ 379/433; 379/420
[58] Field of Search .................................. 379/433, 420, 379/428; 455/90, 575; 381/386, 387, 395

[56] References Cited

U.S. PATENT DOCUMENTS 5,790,679   8/1998   Hawker et al. .......................... 379/433

*Primary Examiner*—Jack Chiang
*Attorney, Agent, or Firm*—Dicran Halajian

[57] ABSTRACT

This invention discloses a mobile telephone of the cordless or cellular type which has a front face including an earphone and a microphone, and a back face. According to the invention, the opening area of the loudspeaker is situated, through the wall of the telephone, around a circular area of 27 mm in diameter, called closing area, situated opposite the loudspeaker and sound-proof on transmission.

11 Claims, 3 Drawing Sheets

MOBILE TELEPHONE WITH AMPLIFIED LISTENING

DESCRIPTION

Field of the Invention

The present invention relates to a mobile telephone with a front face having an earphone and a microphone and having a loudspeaker for amplified listening, and with a back face.

Telephones, mobiles and cordless telephones also called handheld telephones have an earphone.

A current tendency is the introduction of an additional loudspeaker on these devices, which makes it possible to have amplified listening and thus a hands-free use, which is particularly useful in a vehicle.

This additional loudspeaker may thus also be used for carrying out the ringing function.

Being given a loudspeaker even miniaturized to a diameter of 3 to 3.5 cm, it is impossible to mount the loudspeaker on a side face of the handheld telephone and one is led to install it on one of the main faces.

Any mobile loudspeaker carrying out a function of amplified listening or a hands-free function on a handheld telephone handset may irreversibly damage the auditory system of the user.

BACKGROUND OF THE INVENTION

Actually, nothing can ensure that the user will not directly carry the audio output of the baffle to one of his ears and this either deliberately (notably a child) or unintentionally.

Solutions to the problem mentioned above have been thought of in relation to the place of the loudspeaker on the mobile telephone handset.

A first solution would consist of placing the loudspeaker with its sound opening area on a side face of the handheld telephone, given the fact that it is unnatural to keep the handset to one's ear in a direction perpendicular to the customary direction.

However, this would pose large problems of miniaturization of the loudspeaker as already indicated above.

The loudspeaker may overlap the earphone in which case the same membrane carries out the two functions of listening and amplified listening.

In this case there may be provided to avoid any audio shock, to place an infrared radiation sensor in the immediate proximity of the loudspeaker to recognize notably the closeness to the ear and, in consequence, to inhibit the loudspeaker function.

For certain cordless handsets still another solution consists of placing the loudspeaker on the back face of the handset and, to avoid contact of the output of the loudspeaker and the ear, of placing the handset at the place where the palm of the hand is which is normally in contact with the device when one seizes the handset in customary fashion. Such an arrangement which has been chosen for the cordless telephone according to the DECT standard made by Philips largely suppresses the risk of audio shock by the loudspeaker, but the contact of the latter with the ear remains possible, however, even if it is not natural to put one's ear at such a place, which may lead to acoustic pressure levels which may exceed 40 dBPa(A) for a 8Ω loudspeaker, whereas the maximum admissible level is 30 dBPa(A). On the other hand, the location of the loudspeaker in the middle of the back face makes it difficult to have a communication situation in which a person uses his handset in customary fashion with the earphone against his ear whereas, furthermore, the amplified listening has been turned on for permitting the people around him to hear the whole telephone conversation.

It is an object of the invention to provide a mobile telephone with a loudspeaker for amplified listening which suppresses the risk of audio shock which would be due to the fact that this loudspeaker is too close to the user's ear.

It is another object of the invention to provide a mobile telephone with an amplified listening loudspeaker which is rather omnidirectional.

SUMMARY OF THE INVENTION

These objects are achieved and the drawbacks of the prior art are mitigated due to the fact that the mobile telephone indicated in the first paragraph is characterized in that the opening area of said loudspeaker is situated, through the wall of the telephone, around a circular area of 27 mm in diameter called closing area situated opposite said loudspeaker and sound-proof on transmission.

The basic idea of the invention consists of sufficiently spacing the openings which let the sound of the loudspeaker pass through the wall of the handset, so that when the ear is in contact with this wall close to the loudspeaker the auditory channel can only cover a small part of these openings, typically one third or less.

A preferred embodiment of the invention is characterized in that said opening area of the loudspeaker is formed by at least three openings spaced around the circular closing area. One is thus ensured that a maximum opening may be found just before the auditory channel with a maximum sound pressure level of 30 dBPa(A) for an 8Ω loudspeaker, that is to say, a loudspeaker that is powerful enough.

Generally, the front face comprises all the active parts of the handset which fill it nearly completely, whereas the back face is largely free. Preferably, the loudspeaker according to the invention with its opening area of various spaced openings is situated on the back face of the handset either in the middle thereof as in the prior art or, advantageously, on the upper back face, which place is left free by the hand when the handset is used in normal fashion. In this position the loudspeaker is situated opposite the earphone, that is to say, back-to-back relative to the earphone which is arranged on the upper front face.

Several variants of the invention are possible.

The openings of the loudspeaker may be situated in the immediate proximity of the closing area substantially in the same plane as the latter. Thus, even if the openings are very close together along a circumference, for example, it is physically impossible for the auditory channel to cover more than one third.

According to a second variant, the openings are situated in the parts of the side walls of the mobile telephone closest to the loudspeaker, for example, one (or two) opening(s) in the short wall (upper wall) and one (or two) opening(s) in each of the actual side walls.

A third variant which is a hybrid of the two preceding variants comprises providing the openings at the junction between the plane of the back face and the parts of the side walls of the mobile telephone which are closest to the loudspeaker.

For the second and third variants for which the sound efficiency along the axis of the loudspeaker is diminished, the power of the latter can be improved notably by lowering its resistance to 8Ω.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
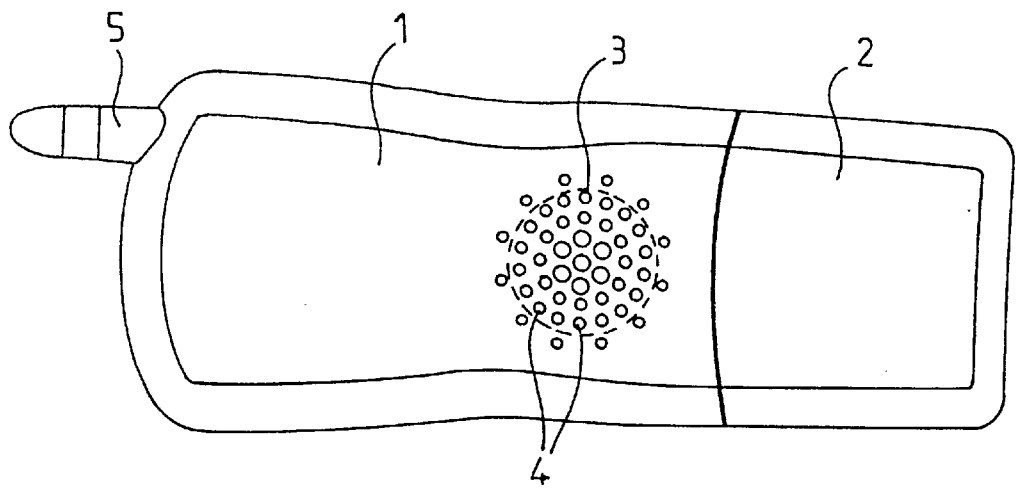
FIG. 1 represents seen from the back and on the side on a reduced scale a prior-art cordless telephone having a loudspeaker for amplified listening.
Figure 2:
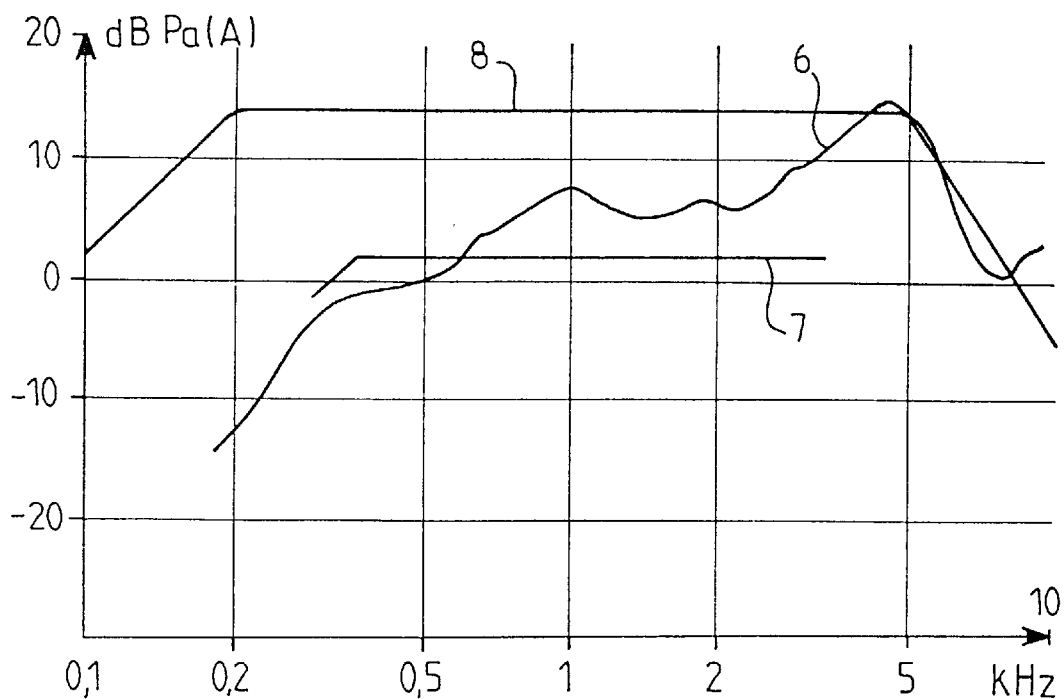
FIG. 2 represents the output sound level of the loudspeaker for the cordless telephone shown in FIG. 1.

The mobile telephone shown in FIG. 1 which is here a cordless telephone comprises on its back face 1 a battery cover 2 and a loudspeaker for amplified listening represented by a broken line 3 underlying its opening situated opposite and formed by a certain number of holes 4 which stretch out with a regular spacing to the inside and as far as the center of the circle which has a diameter slightly larger than that of the loudspeaker. This telephone also includes a transceiver antenna 5. The loudspeaker 3 is, for example, a loudspeaker of the type WDO2902/Y32L or of the type WDO2902/Y8L manufactured by Philips. If one places an artificial ear of the type IEC318 at exactly 10 cm from the loudspeaker 3, one obtains for a 32Ω loudspeaker (the WDO2902/Y32L manufactured by Philips) the response curve of FIG. 2 which expresses the sound levels (in dBPa/(A)) plotted against frequencies (in kHz). This curve is substantially nominal and lies well between two patterns, the lower pattern 7 and the upper pattern 8, which are the standardized patterns for the telephone audio frequencies. If the same artificial ear is held against the back face 1, still in the axis of the loudspeaker 2 with the loudspeaker WDO2902/Y8L of 8Ω, the sound level becomes equal to 36 dBPa(A), which would not be permissible for a human ear for which the maximum permissible level is 30 dBPa(A) (pain threshold). It will be noted that the adopted scale for FIG. 1 is about 0.7 and that the real diameter of the opening of the loudspeaker (circle containing the holes 4) is of the order of about 4 cm, whereas that of the artificial ear, standardized and corresponding in the best way possible to that of the human ear, is 25.4 mm. This means that if the holes 4 were situated in a circle reduced to 25.4 mm, the sound level would amply exceed 36 dBPa(A). After measuring, with the said loudspeaker of 8Ω one finds a value of 41 dBPa(A) even less tolerable than the preceding one.

However, the position chosen in the middle of the back face guarantees that the user would not hold the loudspeaker 3 to his ear inadvertently by mistaking it for an earphone because during a normal grip for its use it is the palm of the hand of the user that covers the loudspeaker and the holes 4.

Figure 3:
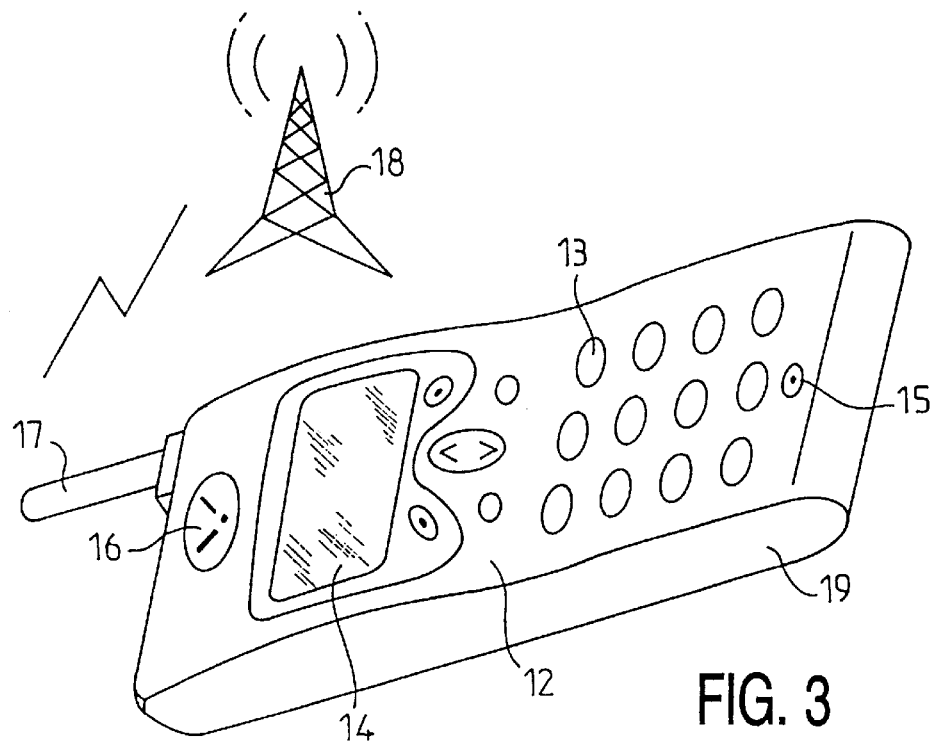
FIG. 3 is a perspective view of the front face of a mobile telephone.

In FIG. 3 may be seen by its front face 12 a radio communication receiver which is here a handheld telephone or mobile. The face 12 has a keyboard 13, a display 14 and, for speaking and listening to a remote person one is speaking to, a microphone 15 and an earphone 16. An antenna 17 makes it possible to receive (or transmit) radio waves from (or to) a transmitter 18.

Figure 4A:
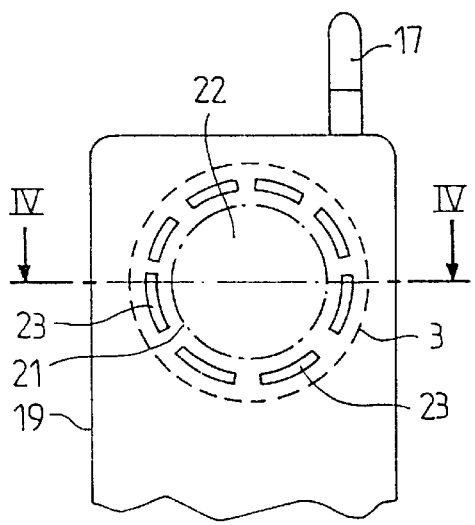
FIGS. 4A–4B and 5A–5B represent on a one-to-one scale in A seen from the back in a cutaway view and in B seen in a cross-sectional view a first and a second embodiment of the invention respectively.
Figure 5A:
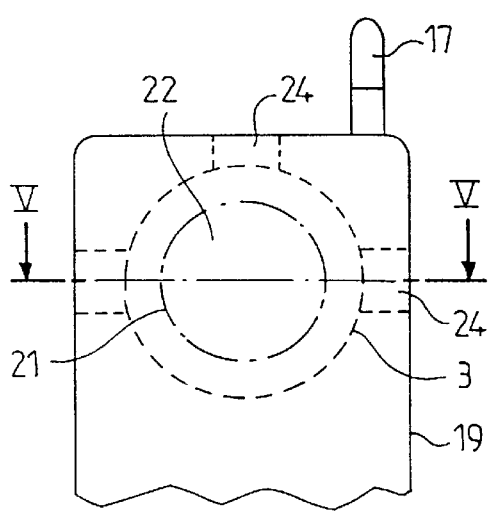
Figure 4B:
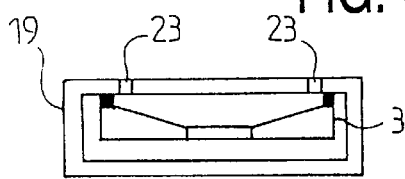
Figure 5B:
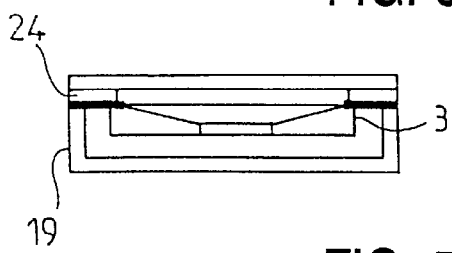

If one wishes to have the telephone shown in FIG. 3 comprise an amplified listening loudspeaker, one takes into account that it is difficult although still possible to place this loudspeaker on the front face, already rather full, for the sake of the miniaturization which features this type of product. Moreover, it is well-nigh impossible to place such a loudspeaker opposite a side face such as 19 because the handset is too thin, still for reasons of miniaturization. Preferably, the loudspeaker according to the invention is placed with its cap on the upper back part of the mobile telephone as represented in FIGS. 4 and 5. In this position, the loudspeaker 3 is placed back-to-back relative to the earphone installed on the upper front face.

In FIGS. 4 and 5 no hole is present in the wall inside an imaginary circle 21 of a dash-and-dot line, concentric to the loudspeaker circle 3 and having a diameter exceeding 25.4 mm, that is to say, the diameter of an artificial or human ear. The area 22 situated inside the circle 21 is thus called closing area of the baffle of the loudspeaker 3. In practice, a tolerance and a circular closing area of 27 mm in diameter will be taken.

For the embodiment shown in FIG. 4, the output openings of the baffle of the loudspeaker 3, referenced 23, are situated in the proximity of the closing area 22, substantially in the same plane, which is that of the back face. If one places an artificial ear against the back wall, exactly on area 22, under the same conditions as above with reference to the FIG. 1, with a loudspeaker of 8Ω, a sound pressure level of 12 dBPa(A) will be obtained because a small part of the sound succeeds in passing through the wall nevertheless. By displacing the ear close to the area 22, this ear could cover at its maximum one third of the holes 23 which leads to a level of 30 dBPa(A) which is considerable but still permissible.

The embodiment of FIG. 5 comprises providing holes in the side wall parts such as 19 which are closest to the loudspeaker. By taking the measures indicated with reference to FIG. 4, similar results are obtained, that is to say, of the order of 12 dB close to the area 22 and of the order of 30 dB close to each of the openings 24.

Figures 6, 7:
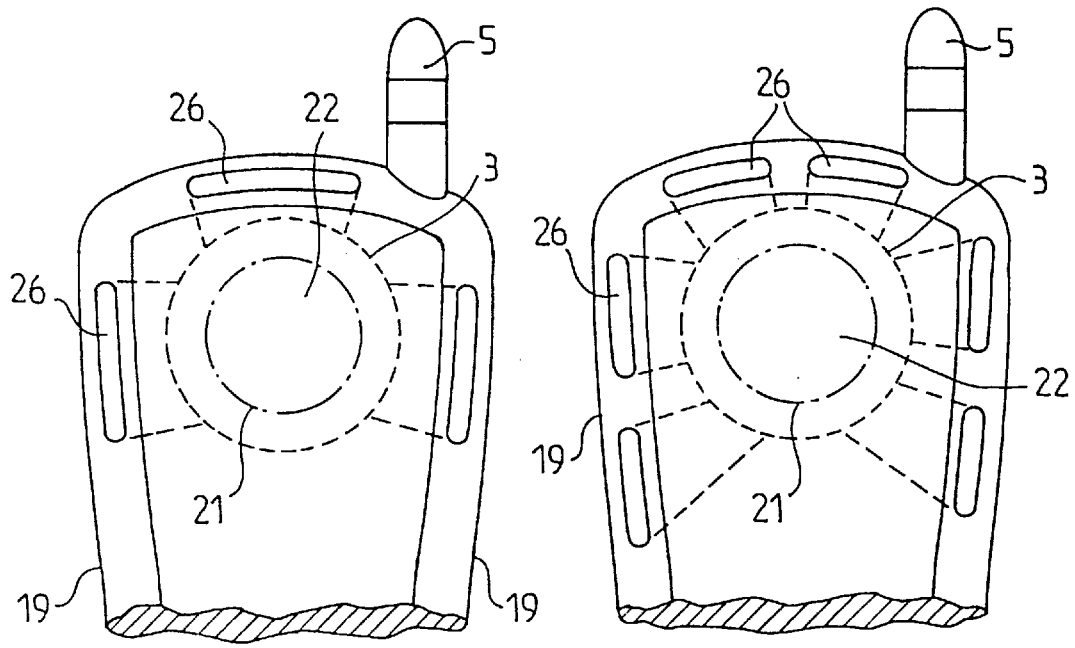
FIGS. 6 and 7 represent on a one-to-one scale in a cutaway view a third embodiment of the invention and FIG. 8 represents the output sound level of the loudspeaker for the third embodiment of the invention shown in FIG. 6.

A third embodiment is represented in FIGS. 6 and 7. This embodiment which is a hybrid of the two embodiments described previously, comprises putting the openings of the baffle of the loudspeaker at the junction between the plane of the back face and the side wall parts, such as 19 of the telephone which are closest to the loudspeaker. These openings are referenced 26 in FIGS. 6 and 7.

Figure 8:
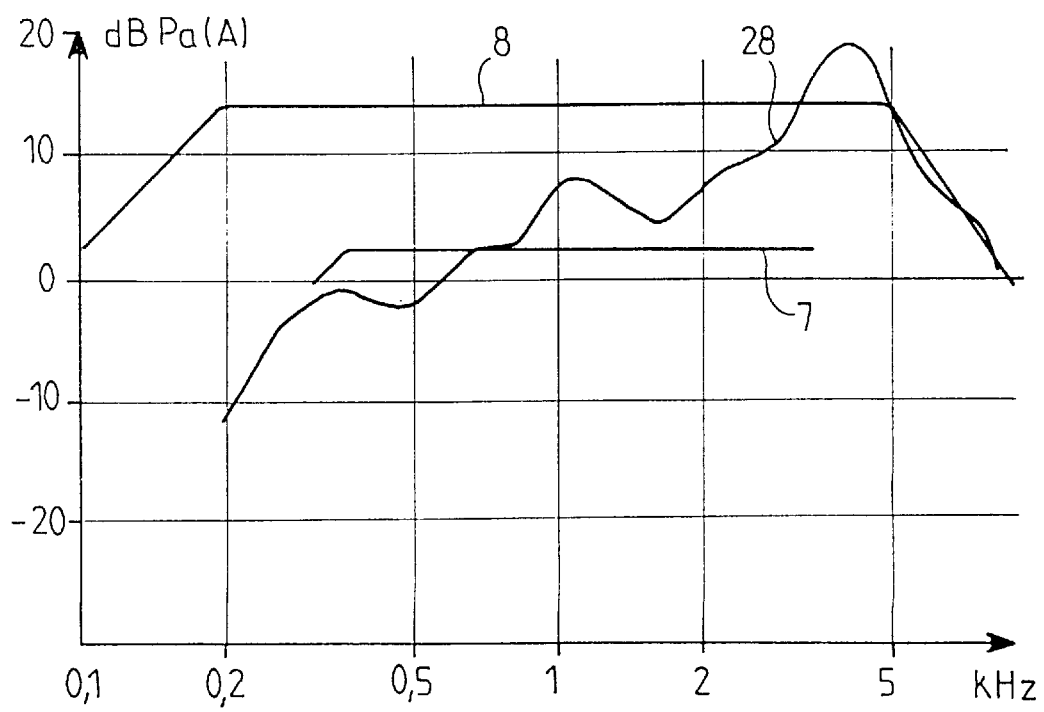

For the embodiments of FIGS. 5, 6 and 7 is obtained an amplified listening loudspeaker which is sufficiently omnidirectional. On the other hand, as regards the sound level in the direction of the axis of the loudspeaker, about three quarters are lost compared to the telephone of FIG. 1. For compensating this, it is advantageous to utilize a loudspeaker of 8Ω instead of 32Ω as this is the case for the measures indicated above with reference to FIGS. 1 and 2, that is to say, a loudspeaker having a power that is four times higher. In the same measuring conditions as those of FIGS. 1 and 2, there is obtained with an artificial ear IEC318 placed at 10 cm on the axis of a loudspeaker of the type WDO2902/Y8L in the telephone of FIG. 6, the curve 28 of FIG. 8, which curve lies substantially between the two patterns 7 and 8 and which is very similar to curve 6 of FIG. 2. Such power produces a level of the order of 30 dBPa(A) on each of the 3 openings for the telephones of the FIGS. 5 and 6. If there is considered that this level is still critical, it is possible to increase the number of openings by doubling them, for example, and spacing them sufficiently as represented in FIG. 7 for the third embodiment.

The invention thus makes it possible to equip a mobile telephone with a loudspeaker for amplified listening, which can be used hands-free notably in a vehicle, or held in hand in its customary position for normal use with a microphone and an earphone while producing a sound level for the voice of the remote interlocutor at least equal to that of a person speaking normally and this in sufficiently omnidirectional manner and without running the risk of a sound shock.

Preferably, the loudspeaker for amplified listening is used by touching a key provided for this purpose without cutting off the operation of the earphone of the telephone.

The invention is not restricted to the embodiments described above. One may notably provide that in the near future it is possible that one physically mixes up the earphone and the amplification function if the evolution of the specifications permits this. In such a case the measures taken according to the invention for arranging output openings of the loudspeaker would be found around the loudspeaker on the upper front face.

The invention is applicable from the moment where a loudspeaker is present on a mobile telecommunication product. It may be applied, as appropriate, to a call function (ringing, melodies, beeps, . . . ) not intended for a function of communication amplification.

What is claimed is:

1. A mobile telephone comprising:

a housing having a front face a back face and side walls located between said front face and said back face;

an earphone;

a microphone; and a loudspeaker for amplified listening having a periphery;

wherein said housing has openings located concentric to the periphery, said openings being located substantially near the periphery so that an area surrounded by said openings is a closing area which does not include further openings.

2. The mobile telephone of claim 1, wherein said closing area is circular and said openings include at least three apertures spaced around said closing area.

3. The mobile telephone of claim 1, wherein said openings are located on said back face.

4. The mobile telephone of claim 1, wherein said openings are located on an upper portion of said back face opposite said earphone which is located on said front face.

5. The mobile telephone of claim 1, further comprising a key which turns on said loudspeaker without having an effect on operation of said earphone.

6. A mobile telephone comprising:

a housing having a front face a back face and side walls located between said front face and said back face;

an earphone;

a microphone; and a loudspeaker for amplified listening having a periphery;

wherein said housing has openings located outside the periphery, and wherein said housing has a closing area which does not include further openings located within the periphery.

7. The mobile telephone of claim 6, wherein said closing area is circular and said openings include at least three apertures spaced around said periphery.

8. The mobile telephone of claim 6, wherein said openings are located on said back face.

9. The mobile telephone of claim 6, wherein said openings are located on said side walls.

10. The mobile telephone of claim 6, wherein said openings are located at a junction of on said side walls and said back face.

11. The mobile telephone of claim 6, further comprising a key which turns on said loudspeaker without having an effect on operation of said earphone.

\* \* \* \* \*